(12) United States Patent
Dornhege et al.

(10) Patent No.: US 10,053,144 B2
(45) Date of Patent: Aug. 21, 2018

(54) METHOD AND APPARATUS FOR LIMITING AN ASSIST STEERING TORQUE

(71) Applicant: FORD GLOBAL TECHNOLOGIES, LLC, Dearborn, MI (US)

(72) Inventors: Jens Dornhege, Pulheim (DE); Frank Peters Engels, Solingen (DE); Götz-Philipp Wegner, Dortmund (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/174,490

(22) Filed: Feb. 6, 2014

(65) Prior Publication Data

US 2014/0222295 A1 Aug. 7, 2014

(30) Foreign Application Priority Data

Feb. 6, 2013 (DE) .......................... 10 2013 201 923

(51) Int. Cl.
| | | |
|---|---|---|
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |

(Continued)

(52) U.S. Cl.
CPC .................................. *B62D 6/002* (2013.01)

(58) Field of Classification Search
USPC .......................................................... 701/42
See application file for complete search history.

(56) References Cited

U.S. PATENT DOCUMENTS 6,838,846 B2 * 1/2005 Matsuoka ............ B62D 5/0466
180/443
8,630,771 B2 1/2014 Sternecker et al.
(Continued)

FOREIGN PATENT DOCUMENTS

DE 10 2007 006 232 A1 8/2008
DE 102007006232 A1 * 8/2008
(Continued)

OTHER PUBLICATIONS

English Translation of Japanese Patent Pub. No. JP,2011-057173,A to Yamada.*
(Continued)

*Primary Examiner* — Jean Paul Cass
(74) *Attorney, Agent, or Firm* — Jones Robb, PLLC; Frank Mackenzie (57) ABSTRACT

A method and apparatus for limiting assisting steering torque in a steering system having electronic power assisted steering is provided. In accordance with the method and apparatus, a steering angle change desired by the driver is determined and a range of valid steering angle changes dependent upon the steering angle change desired by the driver are defined. Subsequently it is determined whether a current steering angle change is included in the range of valid steering angle changes, and if the current steering angle change is not included in the range of the valid steering angle changes, the assisting steering torque is limited.

24 Claims, 5 Drawing Sheets

(51) Int. Cl.
 *G06F 17/00* (2006.01)
 *G06F 19/00* (2018.01)

(56) References Cited

U.S. PATENT DOCUMENTS

| | | | |
|---|---|---|---|
| 8,996,254 B2* | 3/2015 | Nishikawa | |
| 2003/0036683 A1* | 2/2003 | Kehr | G06F 19/325 600/300 |
| 2003/0055549 A1* | 3/2003 | Barta | B60G 17/0182 701/70 |
| 2010/0211264 A1* | 8/2010 | Wey | B62D 6/00 701/41 |
| 2011/0093292 A1* | 4/2011 | Hussann | G06F 19/363 705/3 |
| 2012/0101685 A1* | 4/2012 | Engels | B62D 5/0481 701/41 |
| 2015/0134202 A1* | 5/2015 | Dawson | B62D 7/1509 701/41 |

FOREIGN PATENT DOCUMENTS

| | | | | |
|---|---|---|---|---|
| DE | 102007006232 A1 * | 8/2008 | | B62D 5/0463 |
| DE | 10 2009 000 165 A1 | 7/2010 | | |
| DE | 10 2009 027 492 A1 | 1/2011 | | |
| DE | 102009027492 A1 * | 1/2011 | | |
| DE | 10 2009 048 091 A1 | 4/2011 | | |
| JP | 2011057173 A * | 3/2011 | | |
| JP | 2011057173 A * | 3/2011 | | |
| WO | WO-2010/081592 A2 | 7/2010 | | |
| WO | WO2012014399 * | 2/2012 | | |
| WO | WO-2012073358 A1 * | 6/2012 | | B62D 6/003 |
| WO | WO2012073358 A1 * | 6/2012 | | |

OTHER PUBLICATIONS

English Translation of German Patent Pub. No. DE102009027492 A1 to Greul.*
English translation of Nishikawa WO 2012073358A1 to Nishikawa dated Jun. 7, 2012(https://patents.google.com/patent/WO2012073358A1/en?oq=wo2012073358).*
Examination Report issued in German Application No. 102013201923.8 dated Oct. 21, 2013.

* cited by examiner

METHOD AND APPARATUS FOR LIMITING AN ASSIST STEERING TORQUE

CROSS REFERENCE TO RELATED APPLICATIONS

This application claims priority to German Application No. 102013201923.8, filed on Feb. 6, 2013, the entire content of which is incorporated by reference herein.

TECHNICAL FIELD

The present disclosure relates generally to a method and apparatus for electric power assist of a steering system. In particular, the present disclosure relates to a method and apparatus for limiting an assisting steering torque in an electric power assist steering system for motor vehicles.

BACKGROUND

Modern steering systems also comprise electronic power assisted steering in addition to the conventional servo powered assistance for the driver. The electronic power assisted steering renders possible, for example, the superimposition of steering torques within the scope of assistance systems for the driver, which increases comfort and safety. In addition, the electronic power assisted steering renders it possible to reduce the disturbing influences of torque that are transmitted to the steering wheel from the vehicle or from the road surface. The servo powered assistance is defined in this connection as a torque superimposition system that is dependent upon the driver manual torque and increases the driver manual torque. The electronically powered assistance is generally independent from the driver manual torque and can even counteract the driver manual torque in order to provide power assisted steering torque, correction steering torque or assistance steering torque, by way of example in order to prevent any departure from the driving lane or in order to provide the driver with information with respect to the steering situation.

With the introduction of electronic power assisted steering systems for road-borne vehicles, it is not only necessary to demonstrate the mechanical integrity of the steering system but it is also necessary to ensure that the driver retains control of the vehicle at all times and that protection is provided against any possible electrical failures. With the large number of assist function and driver assistance functions, electrically or digitally transmitted signals are used ever more frequently in order to calculate the steering torque for the electronic power assisted steering. Furthermore, these steering systems provide the opportunity to suppress recognized disturbance variables by means of a correction steering torque or even to influence the vehicle trajectory when recognizing a situation using environment sensors. In the case of the corresponding sensor system, or rather the electrical or digital processing and transmission of the signals, it is necessary to also take into consideration the possibility that an incorrect superimposition of an assisting steering torque, correction steering torque or assistance steering torque cannot be fully suppressed in certain circumstances. It is therefore necessary to limit the effect of potential erroneous steering torques on the reaction of the vehicle in order to ensure that the driver has full control of his vehicle at all times.

The steering wheel is the haptic interface to the driver. If dangerous situations are to be reliably avoided during the superimposition of the steering torques by virtue of the electronically powered assistance, it is important that a superimposed steering torque is always of such a magnitude that the driver remains in control of the vehicle. This also applies in particular in the event of an error, in other words in the case of a superimposed torque that is not justified by a driving situation. The electronically powered assistance is therefore to be designed in such a manner that the worst possible steering torque superimposition in the case of an error does not pose a danger for the entire system comprising driver, vehicle and vehicle situation.

Known approaches for avoiding dangers of this type reside in limiting the amplitude and dynamics of the steering torque of the electronically powered assistance. Customer clinics or rather expert clinics are conducted in order to ascertain controllable thresholds. Owing to varying evaluations, it is necessary to assume the worst case scenario, in other words, any limitation in the case of an error must be geared towards the most critical case or rather to the most critical evaluation. As a result, the possible performance of an electronically powered assistance cannot be fully exploited, i.e., it is not always possible to superimpose steering torques of this type on the driver manual torque, as would be expedient or even necessary for the respective driving situation.

The object of the present disclosure is therefore to provide a method and an apparatus for limiting an assisting steering torque in a steering system having electronic powered assisted steering, which method can more fully exploit the possible performance of the electronically powered assistance.

SUMMARY

In accordance with various exemplary embodiments, the present disclosure provides a method for limiting at least one assisting steering torque in a steering system having electronic power assisted steering. The method comprises determining a steering angle change desired by the driver and defining a range of valid steering angle changes dependent upon the steering angle change desired by the driver. The method further comprises checking whether a current steering angle change is included in the range of valid steering angle changes and, if the current steering angle change is not included in the range of the valid steering angle changes, limiting the assisting steering torque.

In accordance with another aspect of the present disclosure, a system for limiting at least one assisting steering torque of a steering system having electronic power assisted steering is described. The device comprises a storage device configured to store a definition of a range of valid steering angle changes dependent upon a steering angle change desired by a driver and a device for determining a steering angle change that results from a driver manual steering torque and a summation of steering torques of all requested steering torques of the electronic power assisted steering, and for outputting a signal that represents the resulting steering angle change. The system further comprises a device for capturing a signal that represents the steering angle change desired by the driver and a checking device for checking whether the steering angle change resulting from the driver manual steering torque and the summation of the steering torques of all the requested steering torques based on the steering angle change desired by the driver is included in a range of valid steering angle changes. The checking device is operatively connected to the device for determining the steering angle change that results from the driver manual steering torque and the summation of the steering torques of all the requested steering torques, and is operatively connected to the device for capturing a signal that represents the steering angle change desired by the driver, and is operatively connected to the storage device. The system also comprises a limiting device for limiting an assisting steering torque if the check indicates that a steering angle change resulting from the driver manual steering torque and the summation of the steering torques of all the requested steering torques based on the steering angle change that is desired by the driver is not included in the range of valid steering angle changes.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

As used herein, the term "driver manual torque" refers to the torque applied by the driver through the steering system. The term "assisting steering torque" refers to an assist torque applied by an electric power assist system of the steering system. The term "applied steering torque" refers to a combination of the driver applied manual torque and the assisting steering torque.

As used herein, a steering angle change desired by the driver is a change that the driver requests by applying manual torque, for example, through the steering wheel. A current steering angle change is the steering angle that results from a combination of the driver applied manual torque and the applied steering torque or summation of all applied steering torques. That is, the current steering angle change is the steering angle implemented by the steering assist system based on the driver's desired steering angle change. The actual steering angle change is a steering angle in which the applied steering torque or summation of all applied steering torques may be limited by the system of the present disclosure so as to fall within an acceptable range of steering angles based on a vehicle's velocity, the driver's desired vehicle trajectory, and the driving situation. In such a case, the driver's desired steering angle change may not be equal to the actual steering angle change.

A method and apparatus for limiting an assisting steering torque that can also be the summation of several assisting steering torques in a steering system having electronic power assisted steering is disclosed. A method in accordance with the present teachings comprises the steps of determining a steering angle change desired by the driver; defining a range of admissible steering angle changes dependent upon the steering angle change that is desired by the driver; determining the current steering angle change; checking whether the current steering angle change based on the driver's desired steering angle change is included in the range of valid steering angle changes; and limiting the assisting steering torque if the check indicates that the current steering angle change based on the driver's desired steering angle change is not included in the range of the valid steering angle changes.

The vehicle driver's perception of any undesired steering torque overlay—and consequently his perception with respect to the controllability of the vehicle—depends on the situation-specific steering activity. An erroneously unintended steering torque overlay is a departure from the driver's desired and planned trajectory and, therefore is a hazard. A change in the yaw rate or change in the lateral acceleration of the vehicle can indicate that the vehicle has departed from the driver's desired trajectory. In any case, an unintended steering angle change is a prerequisite for a departure from the driver's desired trajectory. Even if the departure from the driver's desired trajectory does not lead immediately to a hazardous situation; it can surprise the driver and result in a hasty countering/reaction of the driver which can lead to a hazardous situation for driver and vehicle.

The subjective evaluations of any steering interventions are not primarily determined by the forces and/or torques that occur at the steering wheel, but rather depend upon the extent of the lateral-dynamic reactions of the vehicle, i.e., upon the yaw rates that result from the steering wheel changes associated with the driver applied torque and the applied steering torque overlay. Consequently, the amplitude of the applied steering torque can be more or less ignored, because the driver does not evaluate the controllability of an unintended steering torque overlay on the torque amplitude, rather the driver assesses vehicle reaction resulting from the steering torque overlay. Therefore, the driver feels that the vehicle is controllable when the vehicle does not deviate substantially from the driver's desired trajectory.

There exists a range of all possible steering angle changes. It is possible to select a subset of valid steering angle changes from this range, which shows the driver desired steering angle changes depending on the vehicle speed. That means, the subset includes only steering angle changes which do not lead to hazardous yaw rate or hazardous lateral acceleration. In addition it is possible to determine all acceptable and hazard-free steering angle changes for any given driver desired steering angle change. This determination can be done by computer simulations or test drives in order to establish the range of acceptable steering angle changes.

The range of acceptable steering angle changes can be estimated as the magnitude of the lateral dynamic reactions or yaw rates, which are to be expected in the case of a particular steering angle change. There exists a direct correlation between the lateral dynamic reactions and yaw rates to the driver's controllability evaluation. This approach considers all: the dynamic driver, the vehicle, and the driving situation. In other words, if the current steering angle change leads to a trajectory that is still regarded as a trajectory that is desired by the driver, the assisting steering torque and/or the summation of the assisting steering torques can be regarded as non-critical, if the trajectory itself does not endanger the driver and the vehicle. The applied steering torque or the summation of all applied steering torques are only limited if the assisting steering torque and/or the summation of the assisting steering torques would lead to a significant deviation from the trajectory that is desired by the driver. This allows steering torque overlay depending on the driver, the vehicle, and the driving situation, which maximizes the benefit of each function without violation of the safety requirements. In other words, the limitation is only executed if the applied torque overlay leads to a critical vehicle reaction or to a vehicle reaction that is not desired by the driver. In addition, the limitation will only limit the steering torque to the extent necessary such that the applied steering torque leads to an acceptable critical vehicle reaction or to an acceptable vehicle reaction desired by the driver.

The decision if the valid steering angle change is desired or not can be determined on the driver's desired trajectory. This can be derived by the manual applied driver torque at the steering wheel, referred to herein as the driver manual torque. The intention of the driver can therefore be determined from the driver manual torque that is applied at the steering wheel.

Since the lateral dynamic reactions and/or yaw rates for a particular steering angle assume different values for different vehicle velocities, a steering angle for a high vehicle velocity can leave the driver with a feeling that he cannot control the vehicle, whereas the same steering angle for a low vehicle velocity does not leave the driver with a feeling that he cannot control the vehicle. In an advantageous exemplary embodiment of the method in accordance with the present teachings, a range of acceptable steering angle changes is therefore defined for each vehicle velocity dependent upon the steering angle change that is desired by the driver. In addition, the current vehicle velocity is determined. The range of acceptable steering angle changes, depending on vehicle speed and the driver desired steering angle change, is selected before it is checked whether the current steering angle change is within the subset of the valid steering angle changes. In other words, the limitation of the assisting steering torque is dependent upon the vehicle velocity in addition to being dependent upon the steering angle change that is desired by the driver.

A range of valid steering angle changes can be defined for a steering angle change that is desired by the driver by means of a valid value range for the values of the steering angle change. In this case, the magnitude of the assisting steering torque can be reduced if the current steering angle change exceeds the valid value range. The process of reducing the magnitude of the assisting steering torque can be terminated, if the current value of the steering angle change is within the valid range of the driver desired steering angle change again.

The steering angle change can be represented by the rate of change of the steering angle. Alternatively, it is possible to determine the steering angle change from the repeated measurement of the steering angles. The driver manual torque can be determined as a desired steering angle change which represents the desired steering angle change.

In some situations it may be necessary to correct the steering angle quickly and outside the above described limits. An observation of the situation can, therefore, under certain conditions extend or shift the range of valid steering angle changes. This means that it may be necessary for the driver to perform a greater correction in order to follow the planned vehicle trajectory if the current assisting steering torque does not correspond to the situation. For this reason, the situation observation may only extend or shift the range of valid steering angle changes if this situation observation correspondingly limits the occurrence of an undesired steering torque.

An apparatus for limiting an assisting steering torque (which can also be the summation of several assisting steering torques) in a steering system having electronic power assisted steering is disclosed. In accordance with the present teachings, an exemplary embodiment of the apparatus comprises a storage device that stores a definition of a range of valid steering angle changes dependent upon the steering angle change that is desired by the driver. The apparatus further comprises a device for determining the steering angle change that results from the current steering torque and the summation of the steering torques of all the requested steering torques of the electronic power assisted steering, and for outputting a signal that represents the resulting steering angle change, and/or for outputting a signal that represents the rate of change of the steering angle change. The apparatus additionally comprises a device for receiving a signal that represents the steering angle change that is desired by the driver and/or a signal that represents the driver manual torque; a checking device for checking whether the steering angle change resulting from the current steering torque and the summation of the steering torques of all the requested steering torques (e.g., the steering angle change that is desired by the driver) is included in the range of valid steering angle changes. The checking device is connected to the device for determining the steering angle change that results from the current steering torque and the summation of the steering torques of all the requested steering torques and to the device for receiving a signal that represents the steering angle change that is desired by the driver. The apparatus further comprises a limiting device for limiting the assisting steering torque if the check indicates that the steering angle change resulting from the current steering torque and the summation of all applied steering torques is not in a range of valid steering angle changes.

In the apparatus, the storage device can store, for each of a plurality of vehicle velocities, a definition of a range of valid steering angle changes dependent upon the steering angle change that is desired by the driver. Furthermore, the apparatus comprises a sensor for ascertaining the current vehicle velocity; the sensor can be in particular a velocity sensor that is already available in the vehicle. In an exemplary embodiment of the apparatus, the checking device can be connected with a selector device that selects the corresponding range of valid steering angle changes according to the detected vehicle velocity and depending on the steering angle change that is desired by the driver.

In an advantageous exemplary embodiment of the present disclosure, the apparatus also comprises a situation recognition device that can detect the presence of particular driving maneuvers and/or particular driving conditions. In this exemplary embodiment, the range of allowed steering angle changes can be extended, restricted or shifted dependent upon the detected driving maneuver and/or upon the detected driving condition.

The wheel steering angle is decoupled from the steering wheel angle in a steering system, for example by means of active steering angle superimposition, or in a steer-by-wire system the wheel steering angle is used as opposed to the allowed steering angle change. The term "current steering angle change" used in the present application is therefore not to be limited exclusively to mechanical steering systems and the steering angle that occurs in systems of this type but also includes the corresponding steering angle in systems that use active steering angle superimposition or in steer-by-wire systems.

Figure 1:
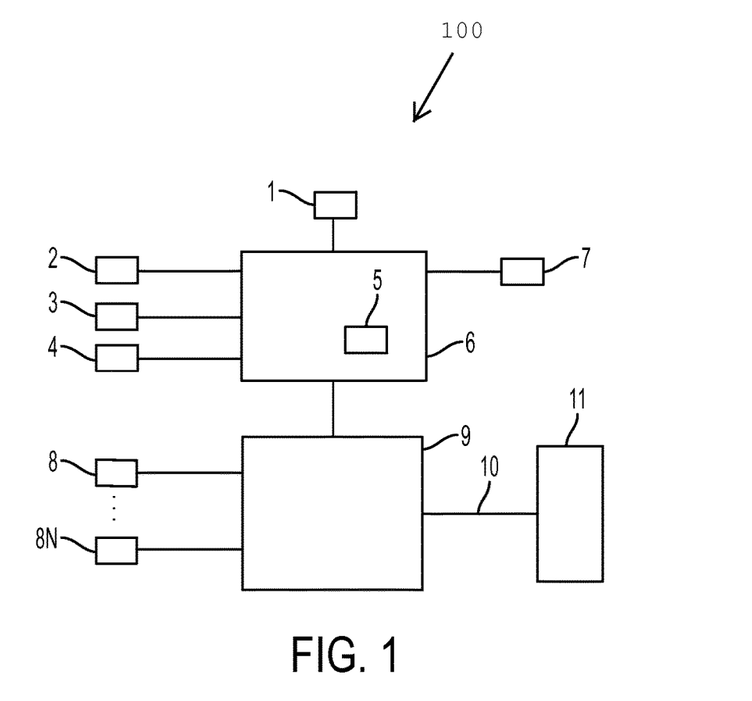
FIG. 1 is a schematic block diagram of an exemplary apparatus for limiting an assisting steering torque in accordance with the present disclosure.

FIG. 1 illustrates an apparatus in accordance with the present teachings in the form of a block diagram. The apparatus 100 comprises a storage device 1 that stores a definition of a range of admissible steering angle changes dependent upon the steering angle change that is desired by the driver. In an exemplary embodiment, the storage device actually stores a plurality of definitions, each for a different vehicle velocity, of a range of valid steering angle changes dependent upon the steering angle change that is desired by the driver. The definitions can be stored in the storage device either in table format and/or by means of functional correlations. The definition of a range of valid steering angle changes dependent upon the driver desired steering angle change can be stored in the form of a value range for the respective driver desired steering angle change, wherein in the present exemplary embodiment the value range is dependent upon the vehicle velocity. In the event that the vehicle velocity is not to be taken into consideration in the method in accordance with the present disclosure, the value range would not be dependent upon the vehicle velocity.

A signal input 2 captures a signal that represents the driver desired steering angle change. In the present exemplary embodiment, the signal from a torque sensor is captured, which torque sensor ascertains the current driver manual torque at the steering wheel.

Furthermore, the apparatus for limiting the assisting steering torque comprises in the present exemplary embodiment a further signal input 3 that is used to capture a signal that represents the current vehicle velocity. This signal that represents the vehicle velocity can, for example, be captured directly by the speedometer, by another control device, or by a vehicle data bus.

Another signal input 4 represents the current change of the steering angle. This can be measured, for example, by means of a steering angle rate-of-change sensor or can be differentiated from a timed series of steering angle measurements.

With the aid of the signal 3 that represents the vehicle velocity, a selector device 5 selects for the current vehicle velocity the corresponding range of valid steering angle changes dependent upon the driver desired steering angle change from the total range made available by the storage device 1.

The signal input 4 of the current steering angle change, the signal input 2 for receiving the signal that represents the driver desired steering angle change, and the signal input for receiving the signal that represents the current vehicle velocity are connected to a checking device 6. Checking device 6 uses the signal that represents the current steering angle change, the signal that represents the driver desired steering angle change, and the signal that represents the current vehicle velocity to check whether the current steering angle change (i.e., the steering angle change implemented by the steering assist system based on the driver's desired steering angle change (including the overlayed assisting torque)) is included in the range of valid steering angle changes, which range is selected by the selector device 5.

An optional situation recognition device 7 can recognize particular driving maneuvers and/or driving conditions, such as for example oversteering and/or understeering situations, and within the maneuvers and conditions extend, restrict or shift the range of valid steering angle changes. In a particular exemplary embodiment, the situation recognition device 7 can make the process of extending, restricting or shifting the range dependent upon which driving maneuver and/or which driving conditions has/have been recognized. For example, depending on the driving situation, such as an oversteer situation, a steering wheel speed range may be reduced or restricted.

Furthermore, the apparatus comprises a number of signal inputs 8 to 8N that capture the requested assisting steering torques of the various electronic power assisted steering systems.

With the aid of the selected range of valid steering angle changes, the checking device 6 checks whether the current steering angle change is included in the range of valid steering angle changes. The checking device 6 then outputs to a limiting device 9 a signal that indicates whether the current steering angle change is included in the range of valid steering angle changes or not. In the event that the current steering angle change is not included in the range of valid steering angle changes, the limiting device 9 limits the requested assisting steering torque or the requested assisting steering torques 8-8N. To this end, the limiting device 9 is connected to at least one signal output 10 by means of which the limited requested assisting steering torques are output to the electronic power assisted steering 11.

In another exemplary embodiment in accordance with the present teachings, the power-assisted steering systems 8-8N communicate directly with the electronic power assisted steering 11 and not with the limiting device 9. In this case, the limiting device 9 transmits to the electronic power assisted steering 11 at least one limitation signal that triggers the limitation process.

Exemplary embodiments of methods of limiting the assisting steering torque are provided. The steps that are to be performed in the checking device 6 are explained in detail below with reference to the flow charts shown in FIGS. 2 and 2A.

In a first step S1, the relevant data, i.e., in the exemplary embodiment shown in FIG. 1, the signal that represents the current steering angle change, the signal that represents the driver desired steering angle change, and the signal that represents the current vehicle velocity are read or received. In step S2, an upper limit for a valid range of steering angle changes is determined on the basis of the current vehicle velocity, the driver desired steering angle change and the associated range of valid steering angle changes. A check is then performed in step S3 as to whether the current steering angle change lies below the upper limit that is determined in step S2. If the current steering angle change lies below the upper limit that is determined in step S2, then the requested assisting steering torques remain unchanged in step S4. However, in the event that it is determined in step S3 that the current steering angle change lies above the upper limit that is determined in step S2, the requested assisting steering torques are changed in step S5 to the extent that the summation of the positive requested assisting steering torques is reduced.

The term "positive requested assisting steering torque" is understood to mean those requested assisting steering torques whose steering torques from the point of view of the driver lead to the steering wheel being rotated in the counter-clockwise direction. Accordingly, "negative requested assisting steering torques" are understood to be those requested assisting steering torques whose steering torques from the point of view of the driver lead to the steering wheel being rotated in the clockwise direction. It is possible to reduce the extent to which the positive requested assisting steering torques are reduced, as soon as the current steering angle change is once again in the valid range of steering angle changes.

Figure 2:
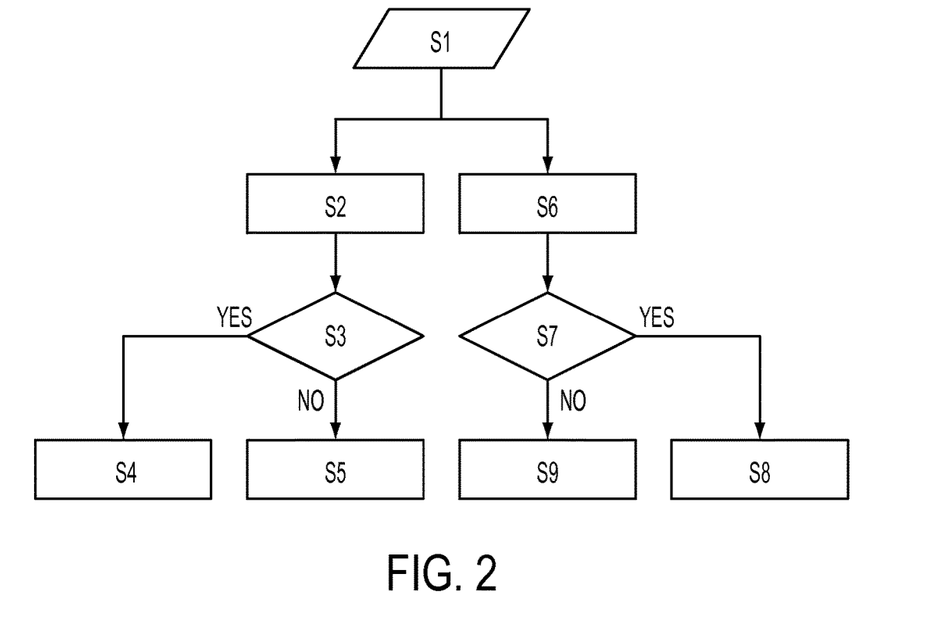
FIGS. 2 and 2A are flow charts illustrating exemplary embodiments of a method for limiting an assisting steering torque in accordance with the present disclosure.

A lower limit for the valid range of steering angle changes is subsequently determined in step S6 on the basis of the driver desired steering angle change, the current vehicle velocity, and the corresponding range of valid steering angle changes. A check is then performed in S7 as to whether the current steering angle change lies above the lower limit that is determined in step S6. If this is the case, the summation of the requested assisting steering torques remains unchanged. However, in the event that in step S7 it is determined that the current steering angle change lies below the lower limit that is determined in step S6, the requested assisting steering torques are changed in step S9 in such a manner that the summation of the negative requested assisting steering torques, i.e., the summation of all the requested assisting steering torques that from the point of view of the driver lead to the steering wheel being rotated in the clockwise direction, is reduced. The extent of the reduction of the negative requested assisting steering torques can be reduced as soon as the current steering angle change is once again in the valid range.

Figure 2A:
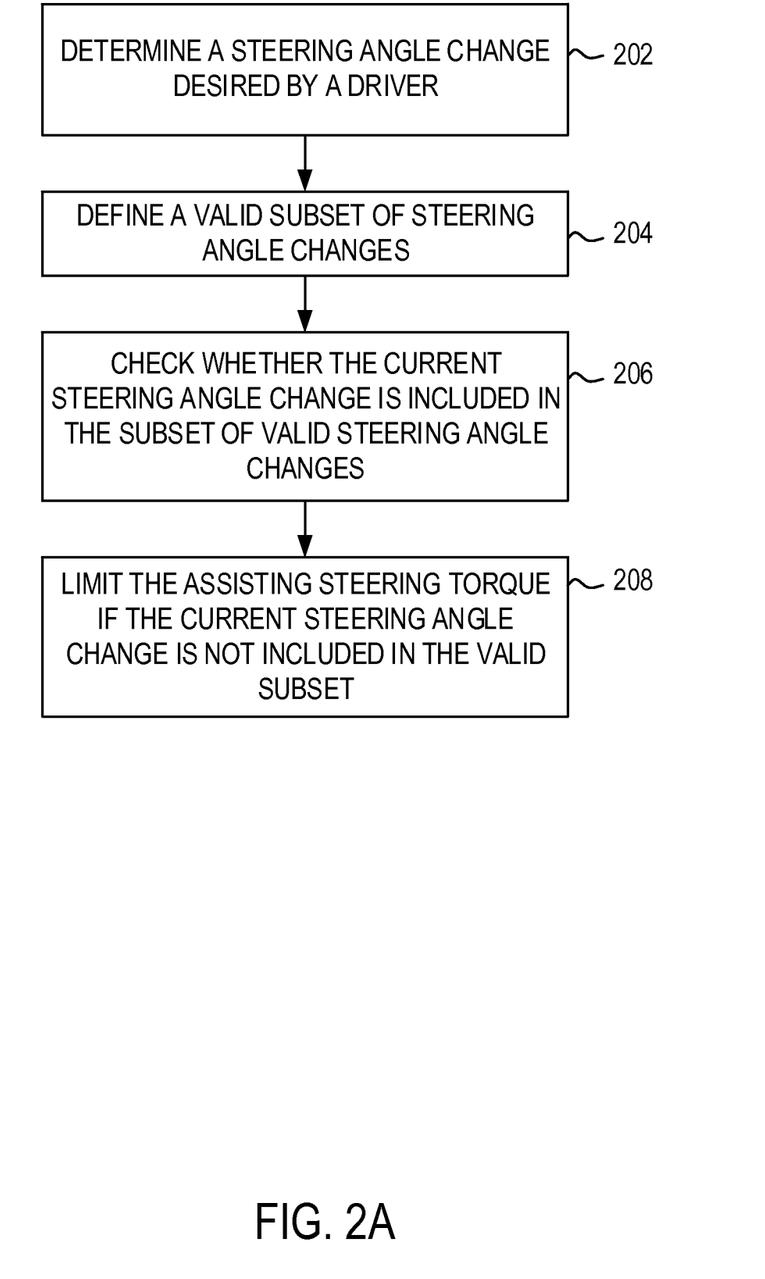

Another exemplary embodiment of a method of limiting the assisting steering torque is shown in FIG. 2A. In a first step 202, a steering angle change desired by a driver is determined. In step 204, a range of valid steering angle changes is defined based on the steering angle change desired by the driver. The range of acceptable steering angle changes can be estimated as the magnitude of the lateral dynamic reactions or yaw rates; the lateral dynamic reactions and/or yaw rates for a particular steering angle assume different values for different vehicle velocities. In step 206, whether the desired steering angle change is included in the predetermined subset of valid steering angle changes is checked. There exists a range of all possible steering angle changes. It is possible to select a subset of valid steering angle changes from this range, which shows the driver desired steering angle changes depending on the vehicle speed. That means, the subset includes only steering angle changes which do not lead to hazardous yaw rate or hazardous lateral acceleration. In step 208, the assisting steering torque is limited if the check indicates that the current steering angle change based on the driver's desired steering angle change is not included in the predetermined subset of valid steering angle changes.

It has been described with reference to FIG. 2 that initially the upper limit for the valid rate of changes of the steering angle is determined and checked prior to determining and checking the lower limit for the valid rate of changes of the steering angle. It goes without saying that this can also occur in reverse, so that initially the lower limit for the valid rate of changes of the steering angle is determined and checked, prior to the upper limit for the valid rate of change of the steering angle being determined and checked. It is likewise possible to implement the two branches in parallel, in other words simultaneously, commencing with step S2 and/or step S6.

Figure 3:
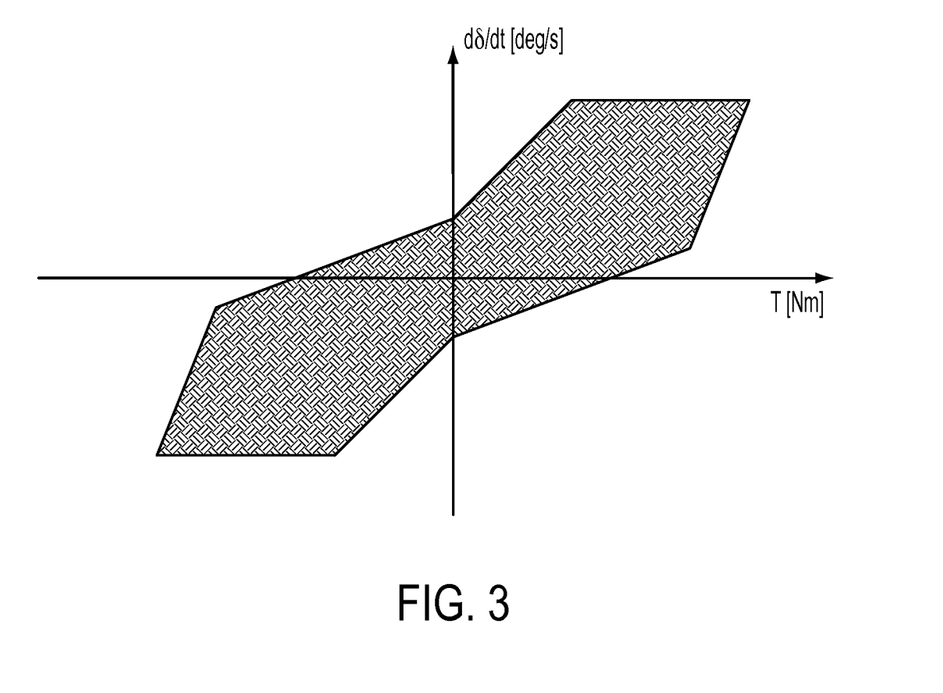
FIG. 3 qualitatively illustrates an exemplary operational envelope plot of allowed rates of change of the steering angle dependent upon the driver manual torque for a high vehicle velocity in accordance with the present teachings.
Figure 4:
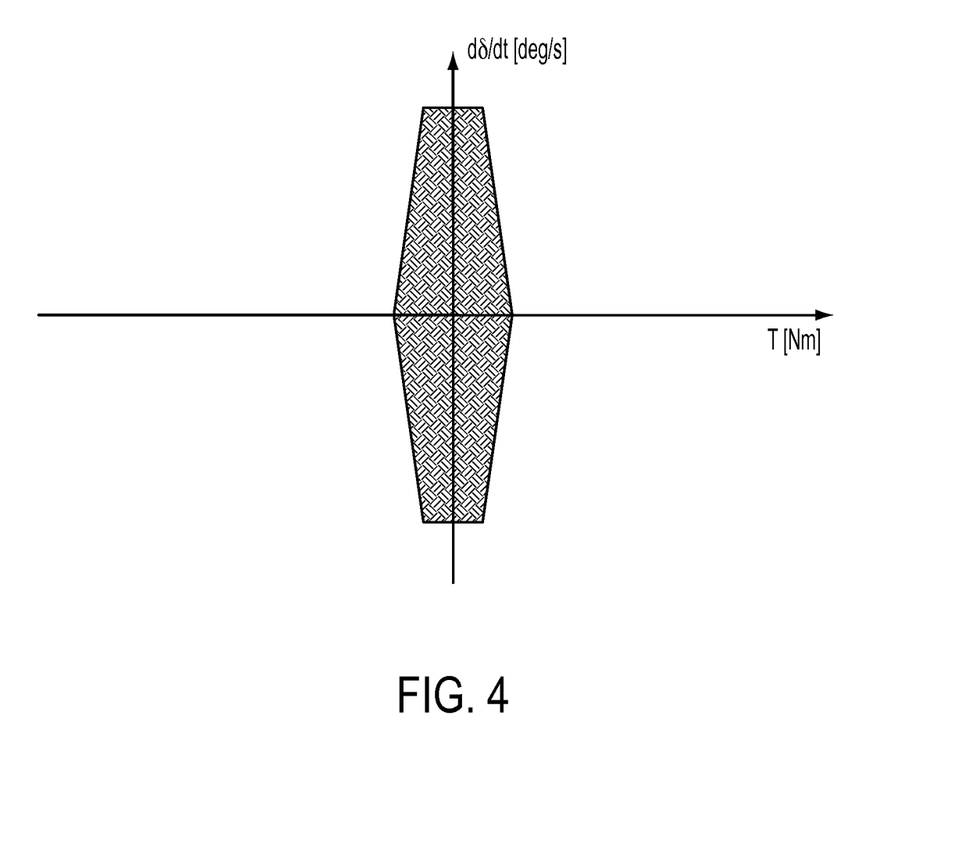
FIG. 4 qualitatively illustrates an exemplary operational envelope plot of allowed rates of change of the steering angle dependent upon the driver manual torque for a low vehicle velocity in accordance with the present teachings.

The process of determining the upper and lower limit for the valid steering angle changes is explained herein with reference to FIGS. 3 and 4. The figures illustrate, for different vehicle velocities, the valid range of steering angle changes dependent upon the driver desired steering angle change. The current steering angle change is represented by a rate of change of the steering angle and the driver desired steering angle change is represented by means of the driver manual torque, in other words by means of the torque that the driver applies to the steering wheel. In FIGS. 3 and 4, the driver manual torque T is plotted on the abscissa axis and the rate of change of the steering angle $d\delta/dt$ is plotted on the ordinate axis.

The range of valid rate of changes of the steering angle dependent upon the current driver manual torque is illustrated in FIG. 3 for a relative high velocity, for example, a velocity of 180 kph or higher. The shaded region represents the range of valid rates of change of the steering angle. The upper and lower limits from the steps S2 and S6 can be determined from FIG. 3, in that in the case of a defined driver manual torque a line is drawn that extends parallel with the ordinate axis. The upper point where the line intersects the border of the shaded region represents the upper limit for the valid rate of change of the steering angle in the case of the selected driver manual torque and the lower point of intersection represents the lower limit. The region between the upper limit and the lower limit is the region of valid rates of change of the steering angle and, in accordance with the present exemplary embodiment, the region represents the region of valid steering angle changes. As is clearly evident in FIG. 3, the upper and lower limit of the range of the valid rates of change of the steering angle is dependent upon the value of the driver manual torque (e.g., is dependent upon the distance of the mentioned perpendicular line from the ordinate axis). As is also evident, as the distance from the ordinate axis increases (i.e., as the magnitude of the driver manual torque increases), the range of valid rates of change of the steering angle (i.e., the range of valid steering angle changes) continuously reduces until the range is zero beyond a specific magnitude of the driver manual torque.

FIG. 4 illustrates a diagram that corresponds to the diagram shown in FIG. 3 but for a relatively low vehicle velocity, for example, a velocity of 50 kph or lower. It is evident that, in the case of a low vehicle velocity even in the presence of small magnitudes of driver manual torque, high rates of change of the steering angle can be valid. The reason for this is that the yaw rates that occur in the case of a low vehicle velocity and a particular rate of change of the steering angle are less than the yaw rates that occur in the case of the same steering angle and a high vehicle velocity and the driver can easily overcome dangerous situations by braking to a standstill. Even in the case of small torques being requested by the driver, the valid range of steering angle changes tends towards zero as a consequence of which the driver is able to reduce the undesired steering actions.

The present invention has been explained in detail with reference to specific exemplary embodiments. Specific variables have been determined within the scope of the exemplary embodiments, for example the driver manual torque or the vehicle velocity. However as is evident to a person skilled in the art, it is not the specific parameters that are of importance, but merely the fact that the determined parameters are used to ascertain the driver desired steering angle change, the vehicle velocity, and the current steering angle change (that results from the current steering torque and the summation of the steering torques of the requested steering torques). Furthermore, the option is available of limiting all additional requested steering torques if the upper or the lower limit of the valid steering angle changes is violated. Moreover, reference is made to the fact that although in the present exemplary embodiment the current vehicle velocity has also been determined, the method can be fundamentally implemented even without involving the vehicle velocity. In this case, the valid ranges of steering angle changes are defined independently from the vehicle velocity, so that the diagrams illustrated in FIGS. 3 and 4 would appear identical. However, by virtue of the fact that the range of valid steering angle changes is defined taking into consideration the vehicle velocity, the advantage is provided, particularly in the case of low vehicle velocities, that it is possible to avoid unnecessary restrictive limitations on the assisting steering torques. The present disclosure is therefore not to be limited to specific combinations of features of the exemplary embodiments but rather merely by virtue of the attached claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for limiting at least one assisting steering torque in a steering system having electronic power assisted steering, the method comprising:
   determining a steering angle change desired by a driver based on a driver manual torque applied at a steering wheel;
   determining a desired trajectory of a vehicle based, at least in part, on the driver manual torque applied at a steering wheel;
   estimating a range of steering angle changes as a magnitude of a lateral dynamic reaction of the steering angle change that substantially maintains the desired trajectory for a vehicle velocity;
   selecting a subset of the estimated range of steering angle changes based upon a detected vehicle velocity;
   subsequent to selecting the subset of steering angle changes, checking whether a current steering angle change is included in the subset of steering angle changes; and
   limiting the assisting steering torque if the current steering angle change is not included in the subset of steering angle changes to prevent significant deviation from the desired trajectory.

2. The method as claimed in claim 1, wherein a magnitude of an assisting steering torque is reduced if the current steering angle change exceeds or falls short of the subset of steering angle changes.

3. The method as claimed in claim 1, wherein determining the current steering angle change includes determining a rate of change of the steering angle.

4. The method as claimed in claim 1, wherein the current steering angle change is a steering angle that corresponds to the driver applied manual torque at the steering wheel and an applied steering torque or summation of all applied steering torques.

5. The method of claim 1, further comprising extending, restricting, or shifting the subset of steering angle changes dependent upon at least one of a detected driving condition and a detected driving situation of a vehicle.

6. The method as claimed in claim 5, wherein the detected driving condition and/or the detected driving situation of the vehicle depends on an extent of yaw rates resultant from the steering angle change associated with the driver applied manual torque and an applied assisting steering torque.

7. The method as claimed in claim 6, wherein extending, restricting, or shifting the subset of steering angle changes ignores an amplitude of the applied assisting steering torque.

8. The method as claimed in claim 1, wherein the selected subset of the estimated range of steering angle changes includes only steering angle changes that do not lead to hazardous yaw rates and/or hazardous lateral acceleration of the vehicle.

9. The method as claimed in claim 8, further comprising determining an acceptable steering angle change for each driver desired steering angle change.

10. The method as claimed in claim 1, further comprising estimating the range of steering angle changes as a magnitude of a yaw rate resultant from the driver desired steering angle change.

11. The method as claimed in claim 1, further comprising limiting the assisting steering torque if a summation of assisting steering torques leads to a deviation from the desired trajectory.

12. The method as claimed in claim 1, further comprising reducing a magnitude of the assisting steering torque if the current steering angle change is not included in the subset of steering angle changes.

13. The method as claimed in claim 1, wherein the detected driving condition is one of an oversteering and/or understeering condition of the vehicle.

14. The method as claimed in claim 1, wherein the detected driving situation is one or more of an erroneous steering torque, a dangerous driving situation, a driving system error, a situation-specific steering activity, a hazardous situation, and/or a vehicle trajectory.

15. A system for limiting at least one assisting steering torque of a steering system having electronic power assisted steering, comprising:
a storage device configured to store a definition of a range of steering angle changes comprising steering angle changes at vehicle velocities that substantially maintain a desired trajectory;
a device for determining a steering angle change that results from a driver manual steering torque and a summation of steering torques of all requested steering torques of the electronic power assisted steering, and for outputting a signal that represents the resulting steering angle change;
a device for capturing a signal that represents the steering angle change desired by the driver;
a checking device for checking whether the steering angle change resulting from the driver manual steering torque and the summation of the steering torques of all the requested steering torques based on the steering angle change desired by the driver is included in the range of steering angle changes, wherein the checking device is operatively connected to the device for determining the steering angle change that results from the driver manual steering torque and summation of the steering torques of all the requested steering torques, operatively connected to the device for capturing the signal that represents the steering angle change desired by the driver, and operatively connected to the storage device;
a limiting device for limiting an assisting steering torque if the checking device indicates that a steering angle change resulting from the driver manual steering torque and the summation of the steering torques of all the requested steering torques based on the steering angle change that is desired by the driver is not included in the range of steering angle changes to prevent significant deviation from the desired trajectory; and
a situation recognition device configured to detect at least one of a driving maneuver and a driving condition of a vehicle, wherein the system is configured to extend, restrict, or shift the range of steering angle changes based on at least one of a detected driving maneuver and a detected driving condition of the vehicle.

16. The system as claimed in claim 15, further comprising:
a device for capturing a signal that represents a current vehicle velocity, wherein the device for capturing the signal that represents the current vehicle velocity is operatively connected to the checking device; and
wherein the checking device comprises a selector device that selects a corresponding range of steering angle changes based upon the steering angle change desired by the driver and based upon the current vehicle velocity.

17. The system as claimed in claim 15, wherein the signal that represents the steering angle change desired by the driver is a signal that represents a driver manual torque.

18. The system as claimed in claim 15, wherein the signal that represents the resulting steering angle change is a signal that represents a rate of change of steering angle.

19. A method for controlling steering torque assist in a steering system, comprising:
determining a desired trajectory of a vehicle based on a driver manual torque applied at a steering wheel;
estimating a range of steering angle changes that substantially maintain the desired trajectory;
checking whether a current steering angle change is included in the estimated range; and
controlling the assisting steering torque to prevent significant deviation from the desired trajectory.

20. The method of claim 19, further comprising selecting a subset of the estimated range of steering angle changes by excluding from the subset a steering angle change that would lead to a significant deviation from the desired trajectory.

21. A system for controlling steering torque assist in a steering system, comprising:
a storage device configured to store a range of steering angle changes that substantially maintain a desired vehicle trajectory for a vehicle parameter;
a device for determining a steering angle change that results from a driver manual steering torque and a summation of steering torques of all requested steering torque assists, and for outputting a signal that represents the resulting steering angle change;
a device for capturing a signal that represents the steering angle change desired by the driver;
a checking device for checking whether the resulting steering angle change is included in the range of steering angle changes; and
a device for controlling an amount of assisting steering torque applied such that an actual steering angle change is included in the range of steering angle changes in order to prevent significant deviation from the desired vehicle trajectory.

22. The system of claim 21, wherein the storage device is further configured to store a subset of the range of steering angle changes that exclude the subset a steering angle change that would lead to a significant deviation from the desired trajectory.

23. The system of claim 22, wherein the significant deviation from the desired trajectory includes one or more of an erroneous steering torque, a dangerous driving situation, a driving system error, a situation-specific steering activity, and/or a hazardous situation.

24. The system of claim 21, wherein the vehicle parameter comprises at least one of a driver desired steering angle change, a vehicle velocity, and a current steering angle change.

* * * * *